US010963118B2

(12) United States Patent
Hsiao et al.

(10) Patent No.: US 10,963,118 B2
(45) Date of Patent: Mar. 30, 2021

(54) ELECTRODE STRUCTURE AND TOUCH PANEL THEREOF

(71) Applicant: Cambrios Film Solutions Corporation, Tortola (VG)

(72) Inventors: Chung-Chin Hsiao, Hsinchu County (TW); Siou-Cheng Lien, Miaoli County (TW); Chia-Yang Tsai, Taoyuan (TW); Yi-Wen Chiu, Chiayi County (TW); Shu-Ping Hsu, Hsinchu County (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/787,586

(22) Filed: Feb. 11, 2020

(65) Prior Publication Data

US 2020/0272263 A1 Aug. 27, 2020

(30) Foreign Application Priority Data

Feb. 25, 2019 (CN) .......................... 201910137451.2

(51) Int. Cl.
*G06F 3/047* (2006.01)

(52) U.S. Cl.
CPC .... *G06F 3/047* (2013.01); *G06F 2203/04112* (2013.01)

(58) Field of Classification Search
CPC ................ G06F 3/047; G06F 2203/04112
See application file for complete search history.

(56) References Cited

U.S. PATENT DOCUMENTS

| 5,230,898 | A | * | 7/1993 | Horstmann | A61K 9/7084 424/449 |
| 6,087,008 | A | * | 7/2000 | Yoshida | B41M 5/395 428/32.85 |
| 9,459,750 | B2 | * | 10/2016 | Han | G06F 3/0443 |
| 10,120,515 | B1 | * | 11/2018 | Ghali | G06F 3/0446 |
| 10,510,979 | B2 | * | 12/2019 | You | H01L 51/5215 |
| 10,664,083 | B2 | * | 5/2020 | Ryu | G06F 3/0412 |
| 2010/0110022 | A1 | * | 5/2010 | Chen | G06F 3/0412 345/173 |
| 2011/0268936 | A1 | * | 11/2011 | Kang | G06F 3/0445 428/203 |
| 2012/0176323 | A1 | * | 7/2012 | Cho | G06F 3/044 345/173 |
| 2013/0069887 | A1 | * | 3/2013 | Lee | G06F 3/044 345/173 |
| 2013/0106441 | A1 | * | 5/2013 | Yilmaz | G06F 3/03547 324/658 |

(Continued)

FOREIGN PATENT DOCUMENTS

| JP | 2016197554 A | 11/2016 |
| KR | 20160116957 A | 10/2016 |
| TW | 201901700 A | 1/2019 |

Primary Examiner — Sejoon Ahn
(74) *Attorney, Agent, or Firm* — Cooper Legal Group, LLC

(57) ABSTRACT

An electrode structure and a touch panel including the electrode structure are provided. The electrode structure includes a membrane layer and a metallic nanowires layer having metallic nanowires. A first portion of the metallic nanowires layer is covered by the membrane layer, and a second portion of the metallic nanowires layer is exposed out of the membrane layer. The membrane layer is made of a copolymer formed by mixing two or more materials having different functional groups.

20 Claims, 13 Drawing Sheets

(56) References Cited

U.S. PATENT DOCUMENTS

| | | | |
|---|---|---|---|
| 2014/0055379 A1* | 2/2014 | Ma | G06F 3/0443 |
| | | | 345/173 |
| 2014/0152910 A1* | 6/2014 | Kang | G06F 1/1652 |
| | | | 349/12 |
| 2014/0160373 A1* | 6/2014 | Hsu | G06F 3/044 |
| | | | 349/12 |
| 2014/0267953 A1* | 9/2014 | Kim | G06F 3/0446 |
| | | | 349/12 |
| 2014/0338735 A1 | 11/2014 | Allemand et al. | |
| 2015/0014023 A1* | 1/2015 | Kim | G06F 3/041 |
| | | | 174/251 |
| 2015/0047885 A1* | 2/2015 | Chang | H05K 3/02 |
| | | | 174/257 |
| 2016/0073494 A1* | 3/2016 | Uchida | H05K 3/1283 |
| | | | 345/173 |
| 2016/0170521 A1* | 6/2016 | Choi | G06F 3/0446 |
| | | | 345/174 |
| 2017/0160837 A1* | 6/2017 | Tsukamoto | G06F 3/041 |
| 2018/0246617 A1* | 8/2018 | Morrison | G06F 3/04883 |
| 2018/0335874 A1* | 11/2018 | Li | H05K 1/097 |

* cited by examiner

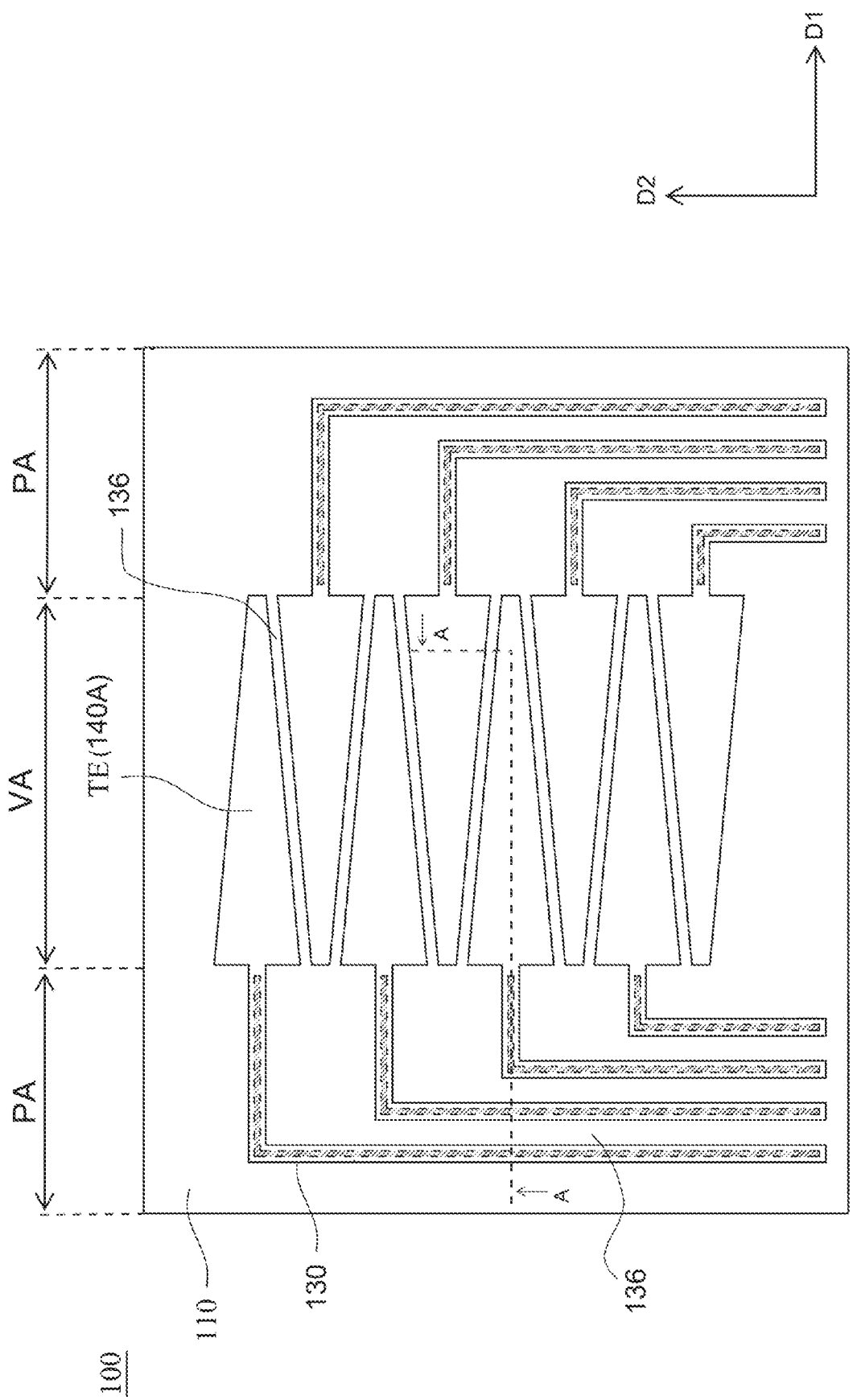

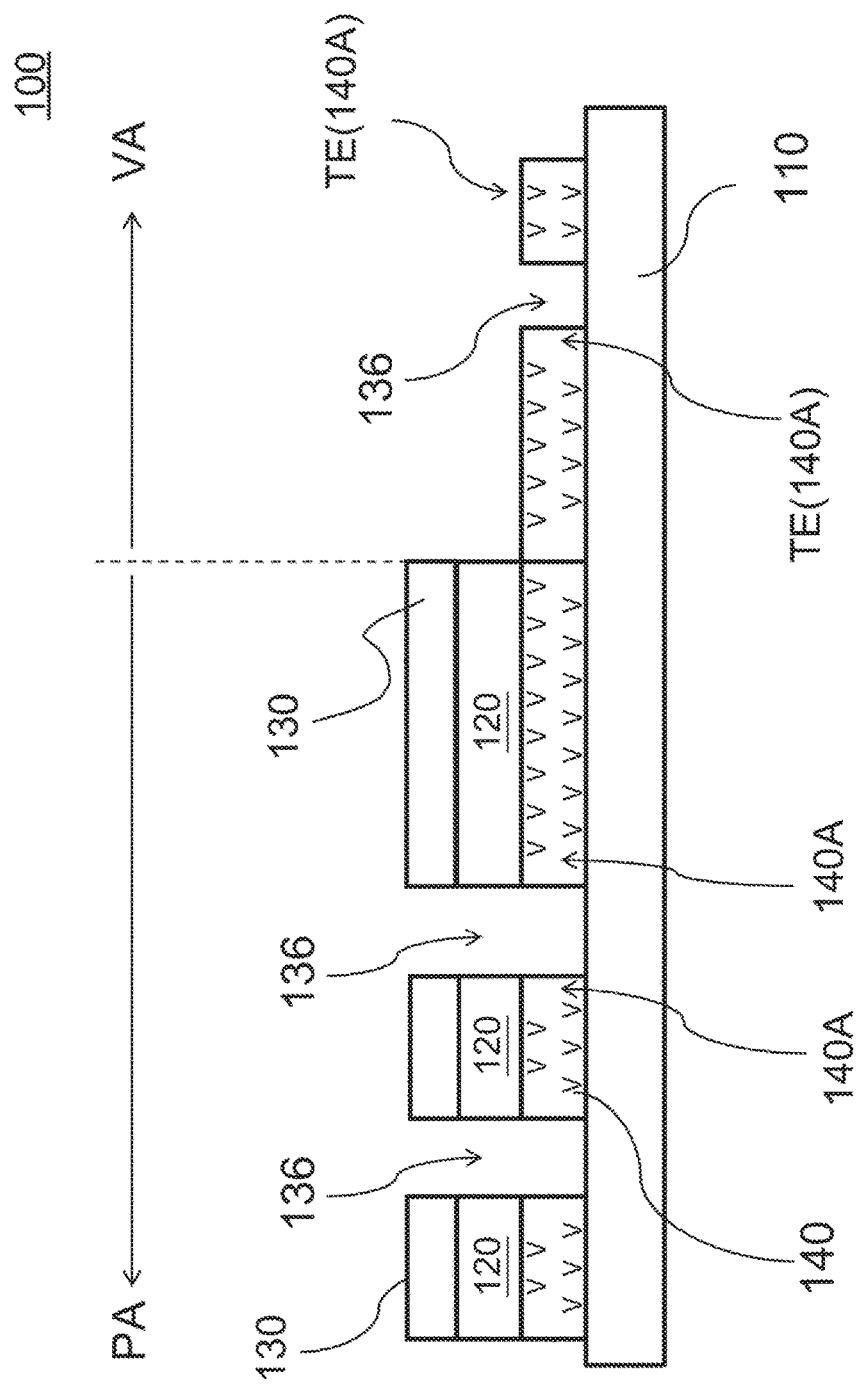

ELECTRODE STRUCTURE AND TOUCH PANEL THEREOF

CROSS-REFERENCE TO RELATED APPLICATION

This application claims priority to Chinese Application Serial No. 201910137451.2, filed Feb. 25, 2019, which is herein incorporated by reference.

BACKGROUND

Field of Disclosure

The present disclosure relates to an electrode structure and touch panel thereof.

Description of Related Art

A transparent conductor can be applied to a device associated with a display panel or a touch panel since the transparent conductor simultaneously has good transmittance and proper conductivity. In general, the transparent conductor may be various kinds of metal oxides, such as Indium Tin Oxide (ITO), Indium Zinc Oxide (IZO), Cadmium Tin Oxide (CTO), or Aluminum-doped Zinc Oxide (AZO). However, certain features of these metal oxides have encountered challenges, such as lacking flexibility. Under certain circumstances, there is a problem that a patterned metal oxide thin film may be easily observed by users. Consequently, various transparent conductors have been developed recently, such as transparent conductors made of the materials including nanowires or the like.

However, there are still many problems with the process and materials needed to be overcome when touch electrodes are manufactured by the nanowires. For example, it is required that a protective layer be disposed on the nanowires to protect nanowires. However, the protective layer may affect the output optical quality under the circumstances of the application scenarios for image display.

SUMMARY

An electrode structure is provided in some embodiments of the application, including a metallic nanowires layer and a membrane layer, in which a first portion of the metallic nanowires layer is covered by the membrane layer, and a second portion of the metallic nanowires layer is exposed out of the membrane layer, in which the membrane layer is made of a copolymer formed by mixing two or more materials having different functional groups.

In some embodiments of the application, the membrane layer includes an ingredient A and an ingredient B, and the ingredient A includes a derivative/composition/compound having a hydrocarbon group, a carboxyl group, a sulfonic acid group, an amine group, a functional group derived from the above-mentioned groups, or a derivative functional groups thereof, and the ingredient B includes a derivative/composition/compound having an acrylate, aromatic, or aliphatic functional group.

In some embodiments of the application, a ratio of the ingredient A to the ingredient B in the copolymer is 1:1 to 1:5. In some embodiments of the disclosure, the ratio of the ingredient A in the copolymer is less or equal to the ratio (weight ratio or volume ratio) of the ingredient B in the copolymer.

In some embodiments of the application, the membrane layer may be dissolved in a basic solvent. The pH of the basic solvent is greater than or equal to 7.

In some embodiments of the application, the metallic nanowires of the first portion of the metallic nanowires layer are embedded into the membrane layer to form a composite conductive layer.

An electrode structure is provided in some embodiments of the application, including a substrate, a metallic nanowires layer having metallic nanowires, a membrane layer, in which the membrane layer is made of a copolymer formed by mixing two or more materials having different functional groups, and a peripheral routing, in which a first portion of the metallic nanowires layer is covered by the membrane layer, and a second portion of the metallic nanowires layer is exposed out of the membrane layer and forms a touch sensing electrode, in which the peripheral routing includes a peripheral circuit, the membrane layer, and the first portion of the metallic nanowires layer, and the touch sensing electrode is electrically connected to the peripheral routing.

In some embodiments of the application, the touch sensing electrode includes a plurality of sensing electrodes, and a non-conductive area is between the adjacent sensing electrodes.

In some embodiments of the application, the non-conductive area is a gap.

In some embodiments of the application, the sensing electrodes are disposed on a first surface and a second surface of the substrate.

In some embodiments of the application, the touch sensing electrode includes a first touch sensing electrode arranged along a first direction, a second touch sensing electrode arranged along a second direction, a connective electrode electrically connected to the adjacent first touch sensing electrode, an insulating block disposed on the connective electrode, and a bridging conductor disposed on the insulating block, in which the bridging conductor is connected to the adjacent second touch sensing electrodes.

In some embodiments of the application, the membrane layer is formed in a peripheral area rather than a visual area.

A touch panel and a method of manufacturing the same are provided in the application, which achieves the efficacy of high manufacturing efficiency, narrow frames, and good optical and electrical properties of the visual area compared with the recent technology.

The foregoing summary is intended to provide a simplified summary of the present disclosure so that readers may have a basic understanding of the present disclosure. This summary is not a comprehensive overview of the disclosure, and it is not intended to indicate important/critical features of the embodiments of the present disclosure or to define the scope of the present disclosure.

BRIEF DESCRIPTION OF THE DRAWINGS

In order to make the above and other objects, features, advantages and embodiments of the present disclosure more comprehensible, the description of the drawings is as follows:

FIG. 8 is a schematic view of the touch panel according to one embodiment of the present disclosure.

FIG. 8A is a schematic cross-sectional view of the FIG. 8 along the line A-A.

DETAILED DESCRIPTION

Figure 1:
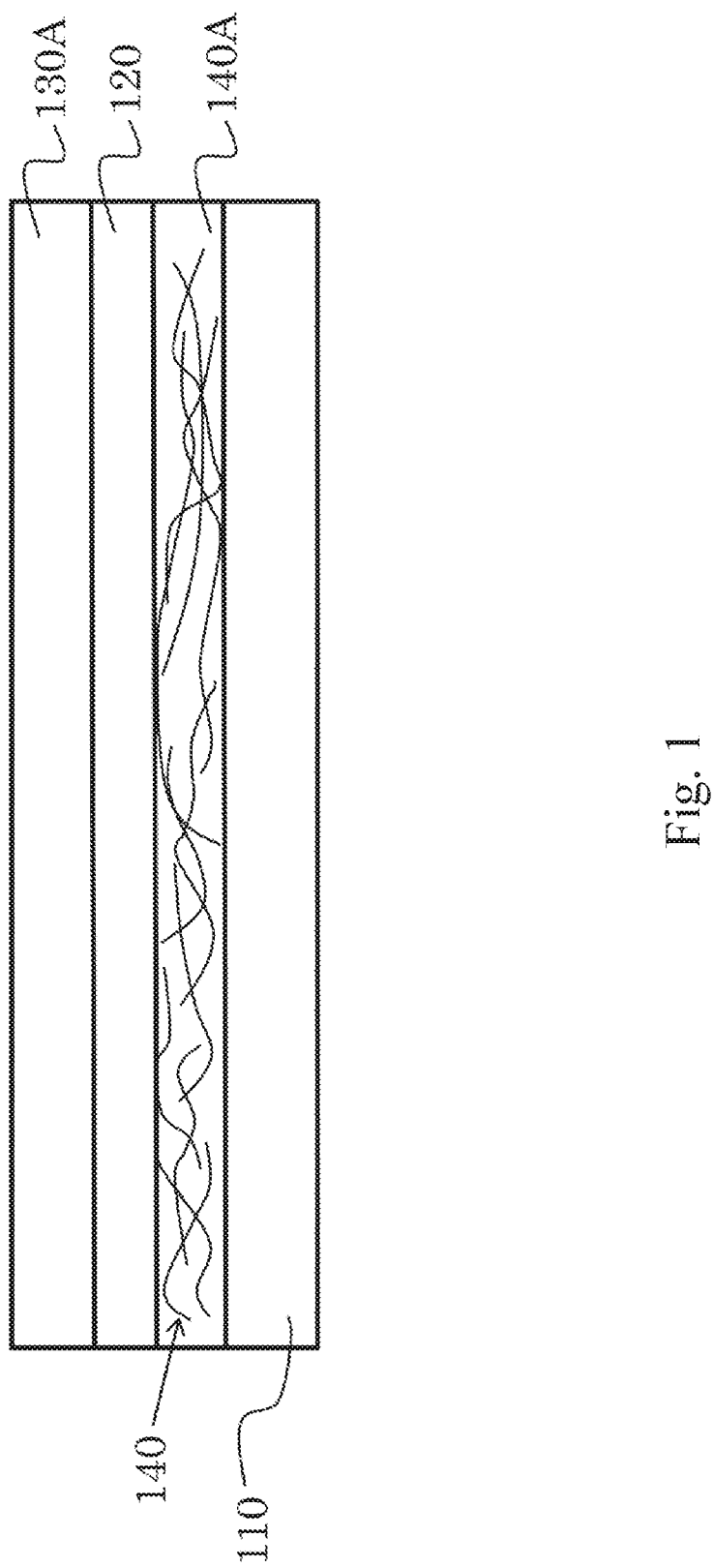
FIG. 1 is a schematic view of the first step of a method of manufacturing a touch panel according to some embodiments of the present disclosure.

The embodiments of the application below are disclosed by the drawings. In the following description, numerous specific details will be described in detail in order to illustrate the application clearly. However, it should be noticed that the application is not limited to the specific details described herein. That is, the embodiments of the present disclosure may be practiced without these specific details. Besides, well-known structures and devices are only schematically illustrated in the drawings in order to simplify the drawings.

As used herein, "about" is generally an error or range of a numerical value within about 20 percent, preferably within about 10 percent, and more preferably within about 5 percent. Unless explicitly stated in the context, the numerical values mentioned are regarded as approximate values, that is, errors or ranges indicated by "about". Otherwise, it should be explained that "pattern", "figure" and "picture", as used herein, are regarded as the same or similar meaning, and for convenience, the terms may be used interchangeably in context.

A touch panel 100 is provided in the embodiment of the application, including a substrate 110 and an electrode structure including metallic nanowires layer 140A and a membrane layer 120, in which a first portion of the metallic nanowires layer 140A is covered by the membrane layer 120, and a second portion of the metallic nanowires layer 140A is exposed out of the membrane layer 120, in which the membrane layer 120 includes a compound/mixture including an ingredient A and an ingredient B. The ingredient A may include a composition/compound/derivative having a hydrocarbon group, a carboxyl group, a sulfonic acid group, an amine group, or a functional group derived from the above-mentioned groups, and the ingredient B includes a composition/compound/derivative having an acrylate, aliphatic, or aromatic functional group, or the like.

The compounds including the ingredient A and the ingredient B can be applied in the manufacturing method of the touch panel in the following embodiments. First, the structure illustrated in FIG. 1 is formed. The specific steps may include: the substrate 110 is provided; the metallic nanowires layer 140A made of the metallic nanowires 140 is disposed on the substrate 110; the membrane layer 120 is disposed on the metallic nanowires layer 140A; and the membrane layer 120 is disposed on the conductive layer 130A. The structure illustrated in FIG. 1 can be formed after finishing the steps above.

The structure illustrated in FIG. 1 can be manufactured through any processes, but not limited to the steps described herein.

In one embodiment, the method of manufacturing the metallic nanowires layer 140A on the substrate 110 may include the following steps: a dispersant or an ink including the metallic nanowires 140 is molded on the substrate 110 by the coating method, and the metallic nanowires 140 are attached on the surface of the substrate 110 by drying; in other words, the metallic nanowires 140 are molded to be the metallic nanowires layer 140A disposed on the substrate 110 by the aforementioned drying and fixing step. A visual area VA and a peripheral area PA may be defined on the substrate 110, and the peripheral area PA is disposed on the side edge of the visual area VA, such that the peripheral area PA is disposed on the left area and the right area of the visual area VA. In other embodiments, the peripheral area PA is disposed on a frame area around the visual area VA (i.e., including the right, the left, the upper and the lower side) or disposed on an L-shaped area adjacent to the two sides of the visual area VA.

In some embodiments, the substrate 110 is preferably a transparent substrate, and more specifically, the substrate 110 may be a rigid transparent substrate or a flexible transparent substrate, in which the material is selected from transparent materials including glass, toughened glass, polymethylmethacrylate (PMMA), polyvinyl Chloride (PVC), polypropylene (PP), polyethylene terephthalate (PET), polyethylene naphthalate (PEN), polycarbonate (PC), polystyrene (PS), or the like.

In the embodiments of the application, the dispersant/ink containing the metallic nanowires 140 includes solvent, such as water, alcohol, ketone, ether, hydrocarbon or aromatic solvent (benzene, toluene, xylene, or the like); the dispersant/ink may include additives, surfactant, or binders, such as carboxymethyl cellulose (CMC), hydroxyethyl cellulose (HEC), hydroxypropyl methylcellulose (HPMC), sulfonate, sulfuric ester, disulfonic salt, sulfosuccinate, phosphate ester fluorinated surfactant, or the like. The metallic nanowires layer 140A may be made of, but not limited to, a silver nanowires layer, a gold nanowires layer, or a copper nanowires layer; more specifically, the "metallic nanowires" used herein is a collective term that refers to a collection of metal wires containing multiple elemental metals, metal alloys or metal compounds (including metal oxides), in which the number of metallic nanowires contained therein does not affect the claimed scope of the application, and at least one cross-sectional size (i.e., the diameter of the cross-sectional surface) of the single metallic nanowire is less than 500 nm, preferably less than 100 nm, and more preferably less than 50 nm. The metallic nanostructure, referred to as "wire" in the application, has a high aspect ratio, such as between 10 and 100,000; more specifically, the aspect ratio (length: diameter of the cross-sectional surface) of the metallic nanowires may be greater than 10, preferably greater than 50, and more preferably greater than 100. The metallic nanowires may be formed of any metal, including (but not limited to) silver, gold, copper, nickel, and gold-plated silver. If other items, such as silk, fiber, tube, or the like, have the above-mentioned size and high aspect ratio, they are also covered by the scope of the present application.

In some embodiments of the present application, the metallic nanowires 140 may be silver nanowires or silver nanofibers, which may have an average diameter of about 20 to 100 nm and an average length of about 20 to 100 μm, and preferably an average diameter of about 20 to 70 nm and an average length of about 20 to 70 μm (that is, the aspect ratio is 1000). In some embodiments, the metallic nanowires 140 have a diameter of between 70 nm to 80 nm and a length of about 8 nm.

The dispersant or the ink containing metallic nanowires 140 may be molded on the surface of the substrate 110 in any manner, such as, but not limited to, by a process such as screen printing, nozzle coating, roller coating, or the like. In one embodiment, the process, roll-to-roll, may be used to coat the surface of the substrate 110 continuously supplied with the dispersant or the ink containing the metallic nanowires 140. After the above fixing/drying step, the substances, such as solvent or the like, are dried and volatilized, and the metallic nanowires 140 are distributed on the surface of the substrate 110 in a random manner; preferably, the metallic nanowires 140 are formed fixed on the substrate 110 to avoid falling off in order to form the metallic nanowires layer 140A, and the metallic nanowires 140 can contact each other to provide a continuous current path so as to form a conductive network. The metallic nanowires layer 140A can also form a kind of a conductive structure layer.

Next, the membrane layer 120 is disposed on the metallic nanowires layer 140A. The suitable polymer materials/mixture may be formed on the metallic nanowires layer 140A by the coating method, and after the fixing step, the membrane layer 120 may be formed on the metallic nanowires layer 140A. The material used to manufacture the membrane layer 120 is a copolymer formed by mixing two or more materials with different functional groups, which preferably has the function that has both alkali solubility and improved material properties (such as, but not limited to, acid resistance, increase of the adhesion of the metallic nanowires layer 140A to the substrate, wear resistance, or the like). More specifically, the material of the membrane layer 120 includes the compound containing the ingredient A and ingredient B. The ingredient A mainly provides alkali solubility, including a composition/compound/derivative having a hydrocarbon group, a carboxyl group, a sulfonic acid group, an amine group, the like or a functional group derived from the above-mentioned groups, in which the alkali solubility means that the membrane layer 120 can be dissolved and removed by an alkaline (pH>7) solvent, such as an alkaline developer or an alkaline release agent, in the subsequent process. The ingredient B mainly provides physical/mechanical properties, including a composition/compound/derivative having acrylates (i.e., chemical compounds containing acrylyl groups), aliphatics (such as, but not limited to, alkanes, alkenes, or alkynes), aromatics (such as, but not limited to, simple aromatic rings, multiple rings or heteroatomic rings), or the like. The ingredients A or B can be arbitrarily selected and matched to meet actual requirements for the process; the copolymer can be formed by mixing one or more compounds in ingredient A with one or more compounds in ingredient B. Preferably, the ratio (such as, but not limited to, weight ratio or volume ratio) of the ingredient B in the copolymer is greater than or equal to the ratio of the ingredient A in the copolymer, for example, the ratio of the ingredients A and B may be about 1:1 to 1:5. In addition, solvents such as alcohols, ketones, esters, ethers, or the like can be mixed into the above-mentioned copolymers singly or in combination of any two or more kinds of solvents, so that the copolymers are beneficial to the coating process. Furthermore, a cross-linking agent, a polymerization inhibitor, a stabilizer (such as, but not limited to, antioxidants, UV stabilizers), a surfactant, or the above-mentioned analog or mixture thereof may be added to the above-mentioned copolymer or mixture. In other embodiments, the above-mentioned copolymer may further include one or more kinds of corrosion inhibitors.

In one embodiment, the membrane layer 120 may be prepared by mixing the ingredient A, in which an acid anhydride (such as, but not limited to, acetic anhydride or formic acetic anhydride) is selected as the ingredient A, with the ingredient B, in which a high-molecular material of acrylic series (such as, but not limited to, poly (methylmethmethacrylate) (PMMA)), in which the acid anhydride is an organic compound having two acyl groups bonded to the same oxygen atom, and the acyl groups can be regarded as a functional group derived from a hydroxyl functional group or derived from a carboxylic acid. If the weight ratio of the ingredients A and B in the copolymer is adjusted to 1:1, the solubility of the acidic solution with pH=6 to 6.5 is about 25 to 70 mg/min/g; if the weight ratio of the ingredients A and B in the copolymer is adjusted to 1:2, the solubility of the acidic solution with a pH≤7.0 is approximately 0 mg/min/g. Therefore, in consideration of acid resistance, the weight ratio of the ingredient B in the copolymer is greater than or equal to the weight ratio of the ingredient A in the copolymer; preferably, the range of the weight ratio of the ingredient A and B may be 1:1 to 1:3; more preferably, the weight ratio of the ingredient A and B may be 1:1.5 to 1:2.

In one embodiment, a membrane layer 120 is prepared by a copolymer mixed by the compounds having two kinds of the functional groups selected from the ingredient A and the compound having one functional group selected from the ingredient B. Specifically, a compound having a hydrocarbon functional group (such as, but not limited to, methacrylic acid) and a compound having a carboxyl functional group (such as, but not limited to, maleic acid) are mixed to form the ingredient A, in which the ratio of the two compounds may be about 1:1 to 1:3; an acrylate compound/derivative (such as, but not limited to, polyacrylates or polyacrylonitriles) is selected as the ingredient B. Similar to the foregoing embodiment, the weight ratio of the ingredient A and B may be 1:1 to 1:3; preferably, the weight ratio of the ingredients A and B may be 1:1.5 to 1:2. However, the membrane layer 120 may be prepared by the copolymer mixed by the two above-mentioned ingredients with an appropriate ratio according to the demand.

In one embodiment, a membrane layer 120 is prepared by the copolymer mixed by ingredient A, in which the compound having a hydrocarbyl functional group (such as, but not limited to, methacrylic acid) is selected, with the ingredient B, in which phenol methane (Bisphenol A, BPA (commercial product name is EPON 2002)) is selected. As mentioned above, in consideration of acid resistance, the weight ratio of the ingredient B in the copolymer is greater than or equal to the weight ratio of the ingredient A in the copolymer; preferably, the range of the weight ratio of the ingredients A and B may be 1:1 to 1:3; more preferably, the weight ratio of the ingredients A and B may be 1:1.5 to 1:2.

In one embodiment, the membrane layer 120 may be prepared by mixing the ingredient A, in which a compound having a hydrocarbyl functional group (such as, but not limited to, methacrylic acid) is selected as the ingredient A, with the ingredient B, in which hydrocarbon olefin/fluoroolefin copolymer (commercial product name, Lumiflon) is selected as the ingredient B. As mentioned above, in consideration of acid resistance, the weight ratio of the ingredient B in the copolymer is greater than or equal to the weight ratio of the ingredient A in the copolymer; preferably, the range of the weight ratio of the ingredients A and B may be about 1:1 to 1:3; more preferably, the weight ratio of the ingredient A and B may be about 1:1.5 to 1:2.

In this step, the copolymer or mixture thereof may be molded on the metallic nanowires layer 140A by the coating method, in which the filler may be formed by the copolymer permeating between the metallic nanowires 140, and a fixation step is performed to form the membrane layer 120, which may also be referred to as an overcoat or a matrix. In other words, the metallic nanowires 140 may also be regarded as being embedded into the membrane layer 120. In one specific embodiment, the fixation step may include the following steps: forming the membrane layer 120 on the metallic nanowires layer 140A by heating and baking (the temperature is about 60° C. to about 150° C.) the abovementioned copolymers or mixture thereof. However, the present application is not limited to the aforementioned physical structure between the membrane layer 120 and the metallic nanowires layer 140A. For example, the membrane layer 120 and the metallic nanowires layer 140A may be a two-layer stack to define a two-layer structure, or a composite layer may be formed by stacking the membrane layer 120 and the metallic nanowires layer 140A (that is, a conductive structure layer with a composite type). For clear illustration, the membrane layer 120 and the metallic nanowires layer 140A are drawn as a two-layer stack to define a two-layer structure in the present application.

Next, the conductive layer 130A is disposed on the membrane layer 120. The conductive layer 130A is mainly used in the peripheral area PA to form the peripheral circuit 130 (referring to FIG. 4); the specific method may be performed by coating a metal layer on the membrane layer 120, such as a copper layer, to form the conductive layer 130A. Another specific method may be, but not limited to, coating the silver paste material on the peripheral area PA, and then the silver paste material is fixed to form the conductive layer 130A. In one specific embodiment, the temperature of the silver paste material fixation step is about 90° C. to 110° C., and the fixation time is about 10 to 20 minutes.

Figure 2:
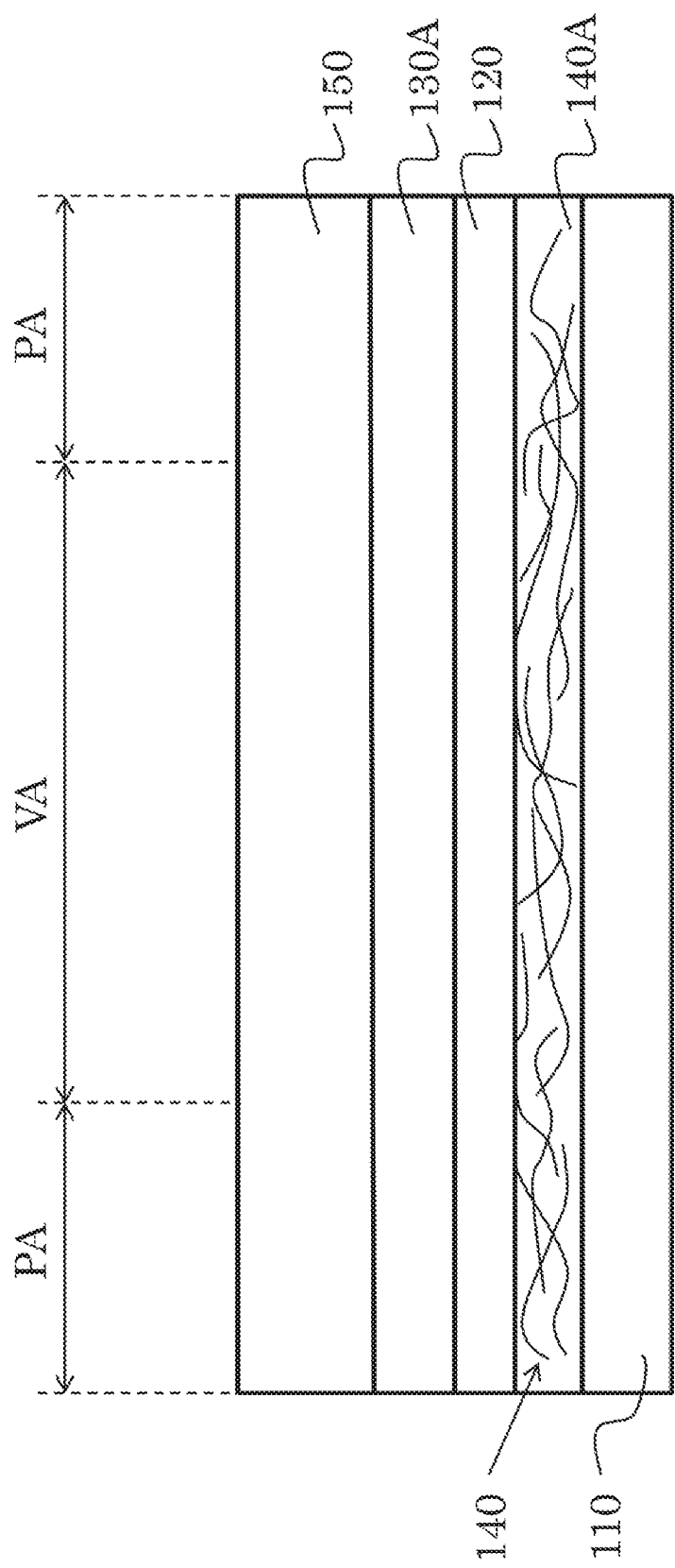
FIG. 2 is a schematic view of the second step of a method of manufacturing a touch panel according to some embodiments of the present disclosure.

Then, the following steps are performed based on the structure shown in FIG. 1: a process of coating a photosensitive material (such as a photoresist) to form a photoresist layer 150, patterning the photoresist layer 150 to form a patterned photoresist, and patterning the conductive layer 130A, the membrane layer 120, and the metallic nanowires layer 140A in order to complete a touch panel 100. The method is, for example, but not limited to, the following steps: referring to FIG. 2, a photoresist layer 150 is formed on the conductive layer 130A. More specifically, the photosensitive material may be coated on the conductive layer 130A by the methods of screen printing, nozzle coating, roller coating, or the like, and then heated to about 80° C. to about 120° C. to be fixed and form the photoresist layer 150; the photoresist used in the method may be a positive type or a negative type photosensitive material. In this embodiment, the positive type photosensitive material is used for description.

Figure 3:
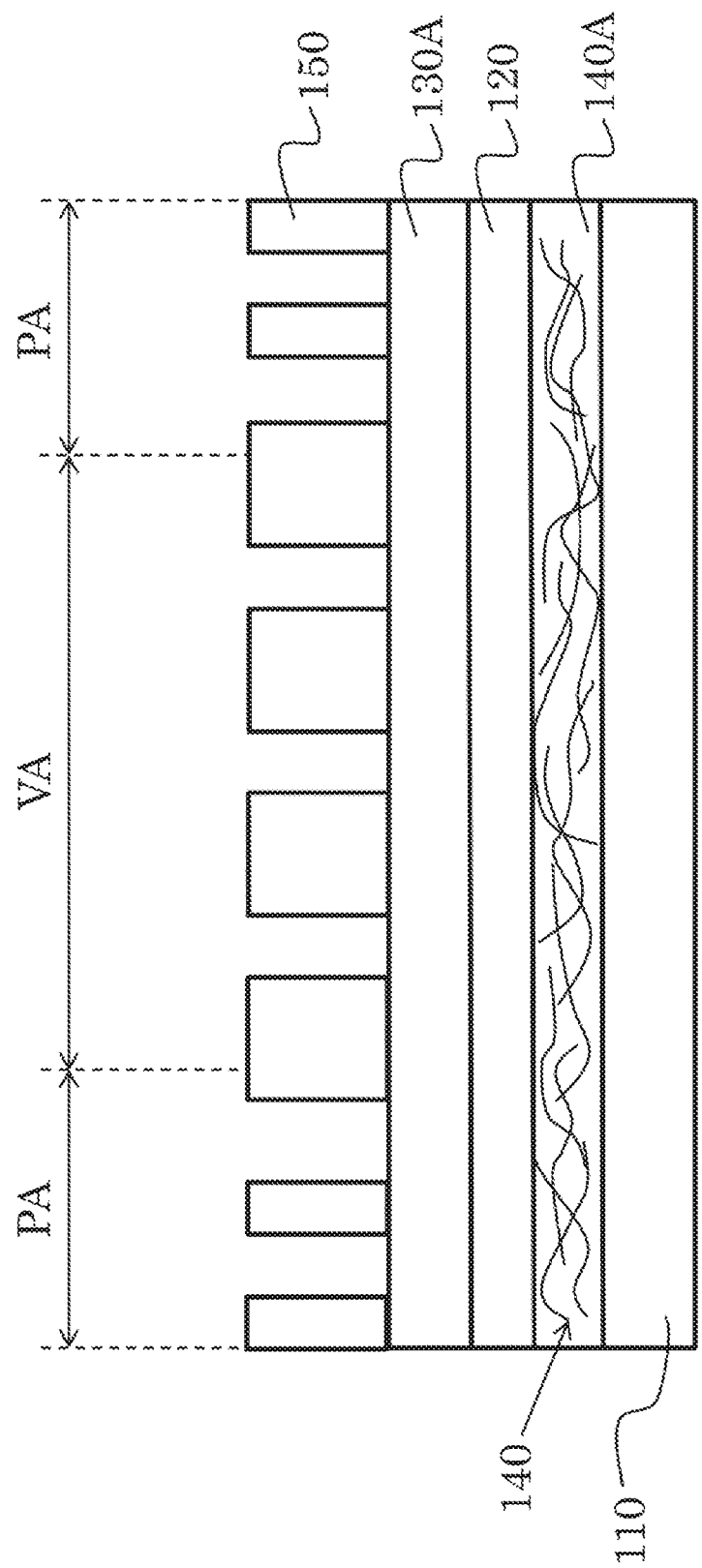
FIG. 3 is a schematic view of the third step of a method of manufacturing a touch panel according to some embodiments of the present disclosure.

Next, referring to FIG. 3, the photoresist layer 150 is patterned. More specifically, in the first lithography process, a photomask is used to cover the photoresist layer 150, and an exposure source (such as UV light) with an exposure energy of about 200 mj/cm$^2$ to about 5000 mj/cm$^2$ is used to transfer the pattern of the photomask to the photoresist layer 150, thereby defining the pattern of the photoresist layer 150 in the visual area VA and the peripheral area PA. In the following embodiment, the photoresist layer 150 in the exposed area is removed using a suitable developing solution; specifically, the photoresist layer 150 in the exposed area may be removed using TMAH, KOH, NaOH, or the like. The lithography process (such as the steps of exposure, development, or the like) is a common process, and it is not described here.

Figure 4:
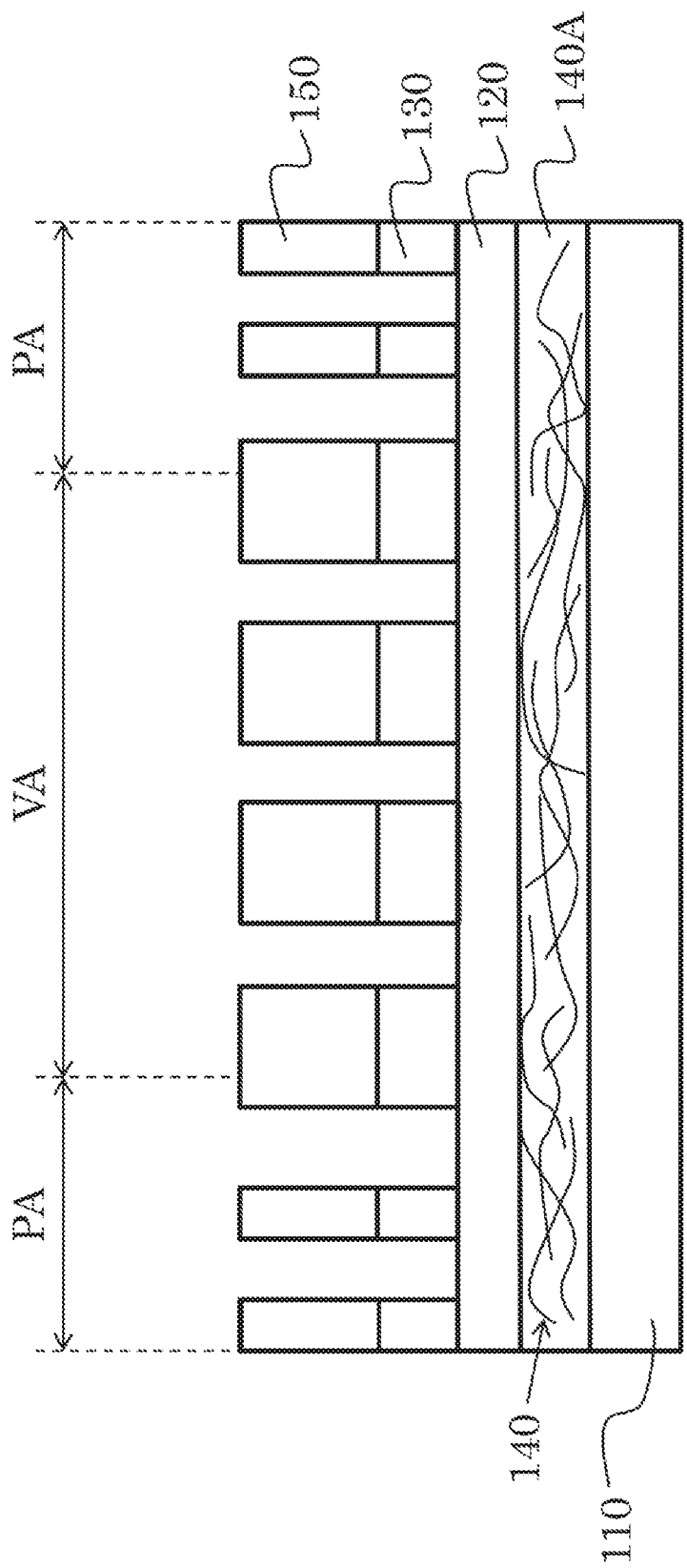
FIG. 4 is a schematic view of the fourth step of a method of manufacturing a touch panel according to some embodiments of the present disclosure.

Next, referring to FIG. 4, the conductive layer 130A is patterned. In one embodiment, the conductive layer 130A is a copper layer. In this step, the photoresist layer 150 is served as an etching mask to pattern the copper layer. In one specific embodiment, the main components of the copper etchant (i.e., a first etchant) are $CH_3COOH$ and $NH_4OH$, thereby forming the peripheral circuit 130 from the copper layer located in the peripheral area PA in this etching step; additionally, the copper layer of the visual area VA will be removed in the subsequent step. In addition, the membrane layer 120 is partially exposed because the copper layer is patterned, and the exposed membrane layer 120 can be removed by contacting the developing solution in the subsequent step.

Figure 5:
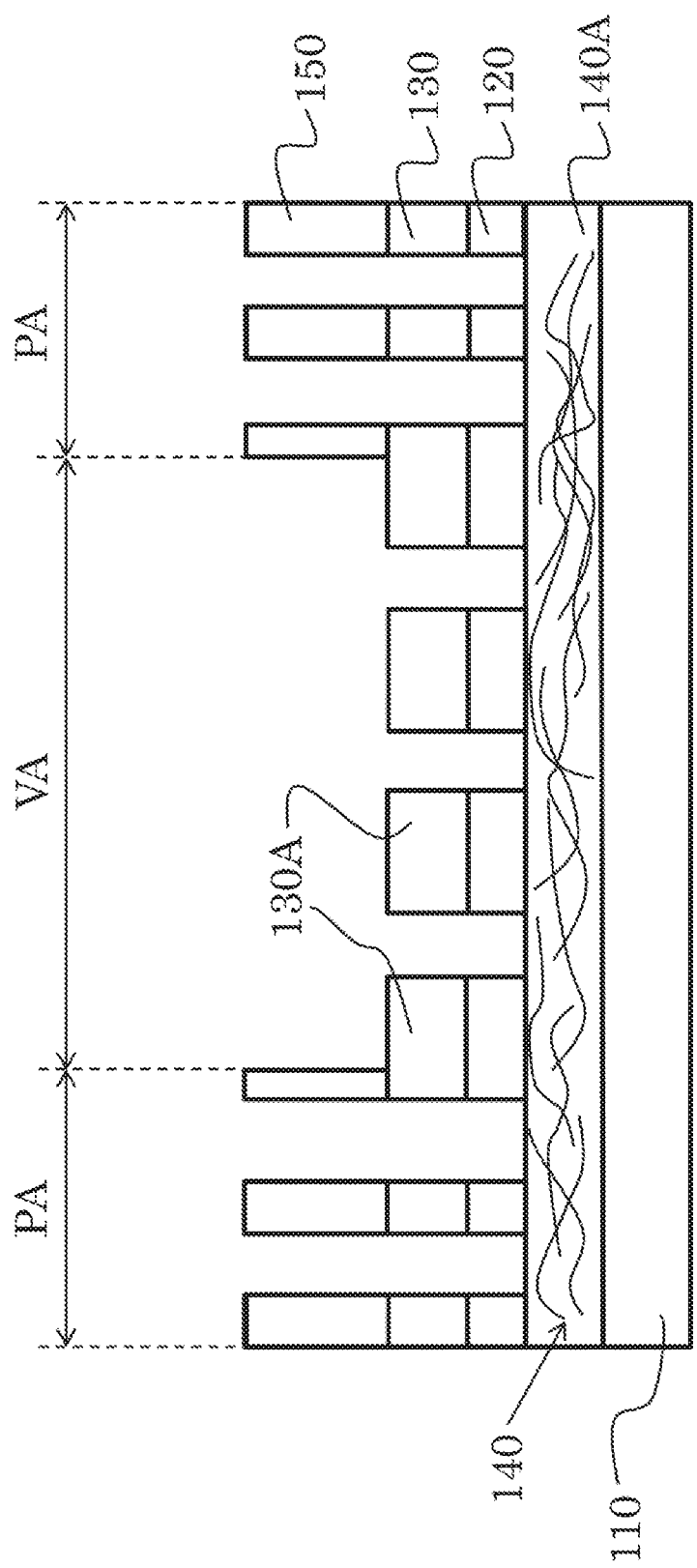
FIG. 5 is a schematic view of the fifth step of a method of manufacturing a touch panel according to some embodiments of the present disclosure.

Next, referring to FIG. 5, a portion of the photoresist layer 150 and a portion of the membrane layer 120 are removed. Specifically, the photoresist layer 150 in the visual area VA is removed in this step, and the membrane layer 120 in the visual area VA and the peripheral area PA which are not covered by the conductive layer 130A/peripheral circuit 130 (that is, the membrane layer 120 exposed in the step referred to with reference to FIG. 4) is also removed in this step. More specifically, the photoresist layer 150 in the visual area VA is first made removable by an exposure process, and then the photoresist layer 150 in the visual area VA is removed using a developing solution; meanwhile, the membrane layer 120 is dissolved in the developing solution and removed, attributable to the alkali solubility of the ingredient A contained in the material of the membrane layer 120. That is, in a second lithography process, the developing solution can remove a portion of the photoresist layer 150 and a portion of the membrane layer 120. The portion of the photoresist layer 150 and the portion of the membrane layer 120 are removed specifically using the basic (pH>7) developing solution, such as TMAH, KOH, NaOH, or the like. In addition, the metallic nanowires layer 140A is partially exposed because the membrane layer 120 is patterned.

Figure 6:
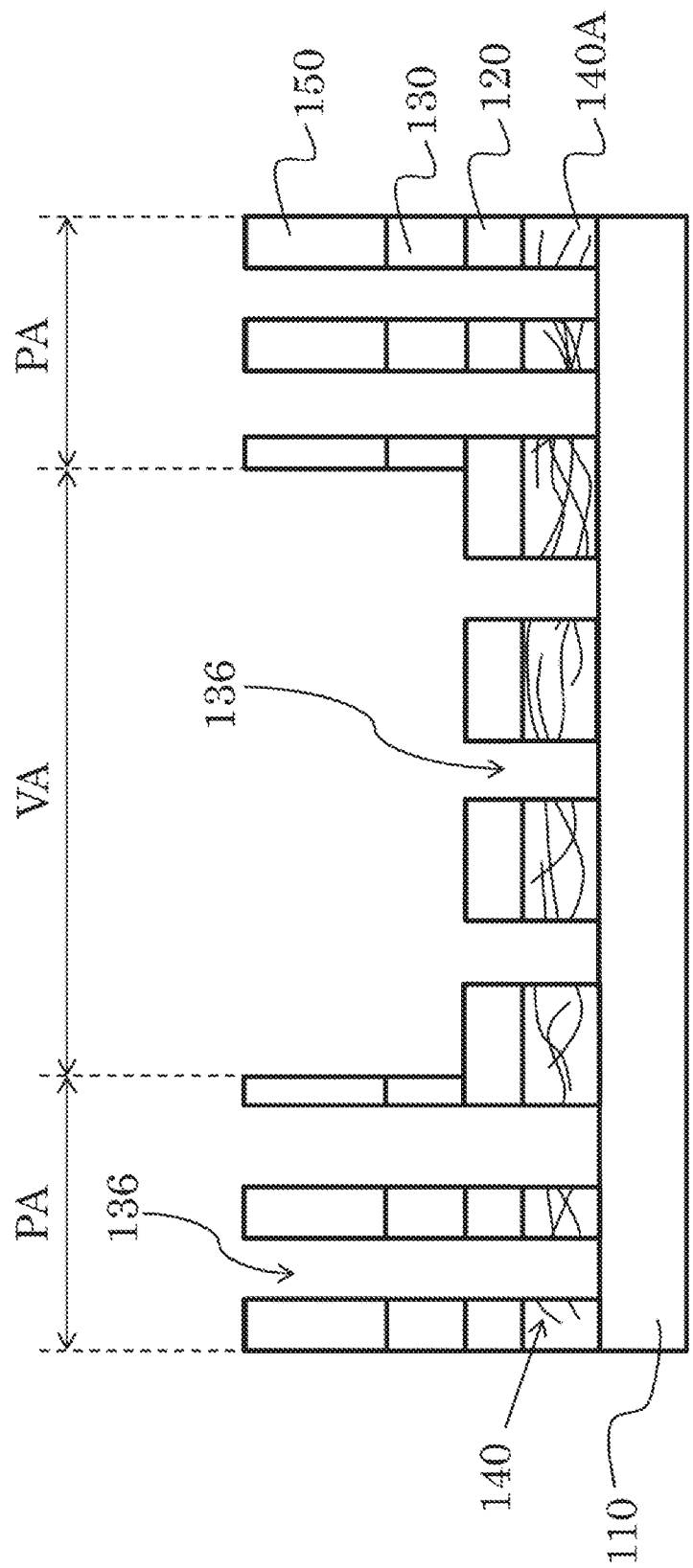
FIG. 6 is a schematic view of the sixth step of a method of manufacturing a touch panel according to some embodiments of the present disclosure.

Next, referring to FIG. 6, a portion of the conductive layer 130A and a portion of metallic nanowires layer 140A are removed. Specifically, the conductive layer 130A in the visual area VA is removed in this step, and the metallic nanowires layer 140A in the visual area VA and the peripheral area PA which are not covered by the membrane layer 120 (that is, the metallic nanowires layer 140A exposed in the step referred to with respect to FIG. 5) is also removed in this step. More specifically, in this step, the copper etchant capable of simultaneously etching the metallic nanowires layer 140A and the conductive layer 130A (i.e., a second etchant) is used to remove the conductive layer 130A located in the visual area VA and the metallic nanowires layer 140A exposed out of the visual area VA and the peripheral area PA in the same process.

According to one specific embodiment, the etchant can be used to etch copper and silver, such as $H_3PO_4$ (the ratio is between 5% to 15%) and $HNO_3$ (the ratio is between 55% to 70%) to remove the materials of copper and silver in the same process while the metallic nanowires layer 140A is a nano silver layer and the conductive layer 120A is a copper layer. In another specific embodiment, the additives can be added to the main components of the etchant, such as an adjuster for etching selection ratio, to adjust the rate of etching copper and silver; for example, 5% to 10% Benzotriazole (BTA) may be added to the main component, which is $H_3PO_4$ (the ratio is between 5% to 15%) and $HNO_3$ (the ratio is 55% to 70%), so as to solve the problem of copper over-etching.

After the above-mentioned etching step, the patterned metallic nanowires layer 140A is formed. In the visual area VA, the sensing electrodes may be made of the patterned metallic nanowires layer 140A (i.e., touch sensing electrodes TE described later), and a non-conductive area 136 (also referred to as an etching area) is between the adjacent sensing electrodes; in the peripheral area PA, the patterned metallic nanowires layer 140A corresponds to the peripheral circuit 130. Specifically, the metallic nanowires layer 140A in the peripheral area PA has the same pattern as the peripheral circuit 130, thereby avoiding the traditional problem of low yield caused by multiple alignments and decreasing the reserved alignment tolerance required for the alignment process in order to reduce the width of the peripheral circuit 130 as much as possible to meet the requirements of the narrow frames of the displays. Preferably, in the peripheral area PA, the lateral surfaces of the patterned metallic nanowires layer 140A, the peripheral circuit 130 and the membrane layer 120 are aligned with each other to form a coplanar surface. It is worth noting that the metallic nanowires layer 140A and the membrane layer 120 substantially form a composite transparent conductive structure. Therefore, the peripheral circuit 130 can achieve the effect of signal transmission by an electrical connection of the transparent conductive structure and the touch sensing electrodes TE below. In this embodiment, the non-conductive area 136 is a gap, which means that no solid material is located in the non-conductive area 136; in other words, the concentration of the metallic nanowires 140 in the non-conductive area 136 is zero, and such an etching step may be referred to as full etching or over-etching.

In one embodiment, the above-mentioned etching process does not completely remove the metallic nanowires 140 in the non-conductive area 136. In other words, the metallic nanowires 140 remain in the non-conductive area 136, but the concentration of the remaining metallic nanowires 140 is lower than a percolation threshold. Such an etching step may be referred to as incomplete etching or partial etching. The conductivity of the metallic nanowires 140 may be mainly controlled by the following factors: a) the conductivity of a single metallic nanowire 140, b) the number of metallic nanowires 140, and c) the connectivity (also referred to as contact) of these metallic nanowires 140; if the concentration of the metallic nanowires 140 is lower than the percolation threshold, the overall conductivity of the nanowires layer is very low, or even zero, because an interval between the metallic nanowires 140 is too far, which means that no continuous current path is provided in the metallic nanowires 140 of the non-conductive area 136; thus, a conductive network cannot be formed; that is, what is formed in the metallic nanowires 140 of the non-conductive area 136 is a non-conductive network. In one embodiment, a sheet resistance of an area or a structure can be considered non-conductive in the following ranges: the sheet resistance is higher than 108 ohm/square, higher than 104 ohm/square, higher than 3000 ohm/square, higher than 1000 ohm/square, higher than 350 ohm/square, or higher than 100 ohm/square (ohm/square). In other words, in this embodiment, the non-conductive area 136 between the adjacent conductive circuits (such as the touch sensing electrodes TE or the peripheral circuit 130) may be filled with the metallic nanowires 140 having a concentration lower than the percolation threshold, which forms the non-conductive network, so as to achieve an insulation between the adjacent conductive circuits.

Figure 7:
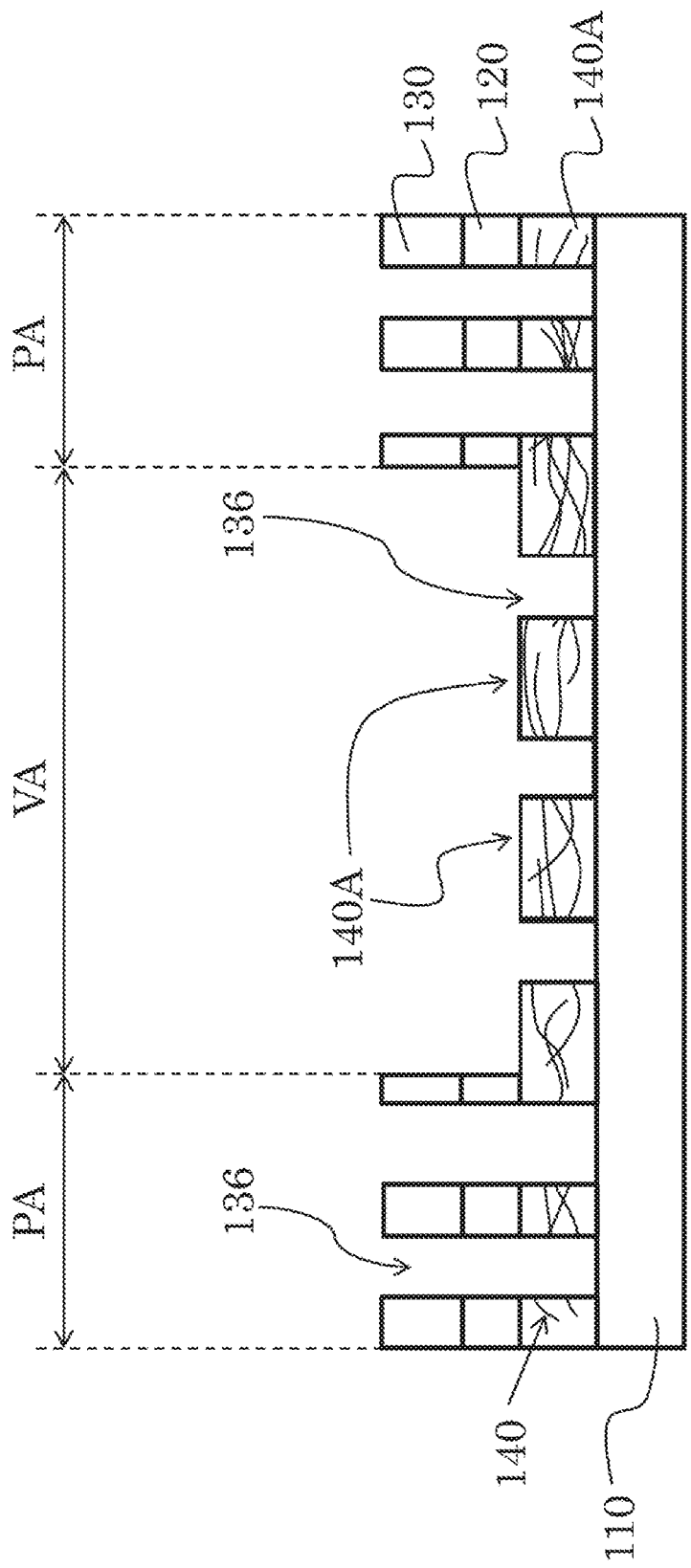
FIG. 7 is a schematic view of the seventh step of a method of manufacturing a touch panel according to some embodiments of the present disclosure.

Next, referring to FIG. 7, a portion of the photoresist layer 150 and a portion of the membrane layer 120 are removed. Specifically, the photoresist layer 150 in the peripheral area PA (that is, the photoresist remaining after the step referred to with respect to FIG. 6) is removed in this step, and the membrane layer 120 in the visual area VA (that is, the exposed membrane layer 120 referred to with respect to FIG. 6) is also removed in this step. More specifically, the photoresist layer 150 in the peripheral area PA is first turned made removable using an exposure process, and then the photoresist layer 150 in the peripheral area PA is removed using the developing solution; meanwhile, the membrane layer 120 is dissolved in the developing solution and removed, attributable to the alkali solubility of the ingredient A contained in the material of the membrane layer 120. That is, in the third lithography process, the developing solution can remove the portion of the photoresist layer 150 and the portion of the membrane layer 120. The same steps as above can be performed using the basic (pH>7) developing solution, such as TMAH, KOH, NaOH, or the like to remove the photoresist layer 150 in the peripheral area PA and the membrane layer 120 in the visual area VA, and the metallic nanowires layer 140A in the visual area VA (i.e., touch sensing electrodes TE described later) is exposed because the membrane layer 120 is patterned.

So far, no membrane layer 120 is on the metallic nanowires layer 140A in the visual area VA; that is, the second portion of the metallic nanowires layer 140A described above forms the touch sensing electrodes TE, and the metallic nanowires layer 140A in the peripheral area PA is covered by the membrane layer 120; that is, the first portion of the metallic nanowires layer 140A described above, and the metallic nanowires layer 140A, the membrane layer 120, and the peripheral circuit 130 in the peripheral area PA can be considered forming a peripheral routing together; the electrode structure of this embodiment is made of the structure above. Since the metallic nanowires layer 140A in the visual area VA is not covered by the membrane layer 120, the influence of the visual effect by the membrane layer 120 can be reduced from the optical point of view.

The above-mentioned processes are only used to describe an exemplary description of manufacturing "the first portion of the metallic nanowires layer 140A covered by the membrane layer 120, and the second portion of the metallic nanowires layer 140A exposed out of the membrane layer 120", and is not intended to limit this application.

FIG. 8 depicts a touch panel 100 according to one embodiment of the present application, including the substrate 110, the peripheral routing, and the touch sensing electrodes TE. The peripheral area PA has a peripheral circuit 130, a membrane layer 120, and a metallic nanowires layer 140A which are underneath the peripheral circuit 130, and the peripheral routing is made of the corresponding peripheral circuit 130, the membrane layer 120, and the metallic nanowires layer 140A; the visual area VA has the touch sensing electrodes TE made of the metallic nanowires layer 140A, and no membrane layer 120 is on the touch sensing electrodes TE, so a better visual effect can be provided; in addition, the touch sensing electrodes TE may be electrically connected to the peripheral routing/peripheral circuit 130 to transmit control signals and touch sensing signals.

Also, as shown in FIG. 8 and FIG. 8A, the touch sensing electrodes TE in this embodiment are generally located in the visual area VA and deposited in a non-staggered arrangement. In other words, the touch sensing electrodes TE may include multiple strip-shaped sensing electrodes extending along the same direction (such as the first direction D1), and the size of each sensing electrode in the second direction D2 increases or decreases, and an etching-removed area can be defined as the non-conductive area 136, wherein the non-conductive area 136 is disposed between the adjacent sensing electrodes to electrically isolate the adjacent sensing electrodes. In this embodiment, there are a total of eight sets of peripheral circuits 130 disposed in the peripheral area PA of the substrate 110. A non-conductive area 136 is between each stack structure (i.e., the peripheral routing made of the peripheral circuits 130, the membrane layer 120, and the metallic nanowires layer 140A) to electrically isolate the adjacent peripheral circuits 130. In this embodiment, the non-conductive area 136 is a gap to isolate the adjacent peripheral circuits 130 or the adjacent sensing electrodes. In one embodiment, the above-mentioned gap can be manufactured using the etching method above, so the metallic nanowires are not protruding from the lateral surfaces (i.e., the etched surface) of the metallic nanowires layer 140A by the above-mentioned etching step. Further, the peripheral circuits 130, the membrane layer 120, and the metallic nanowires layer 140A in the peripheral area PA have the same or similar patterns, sizes, such as long and straight patterns or the like, and the same or similar width.

Figure 9:
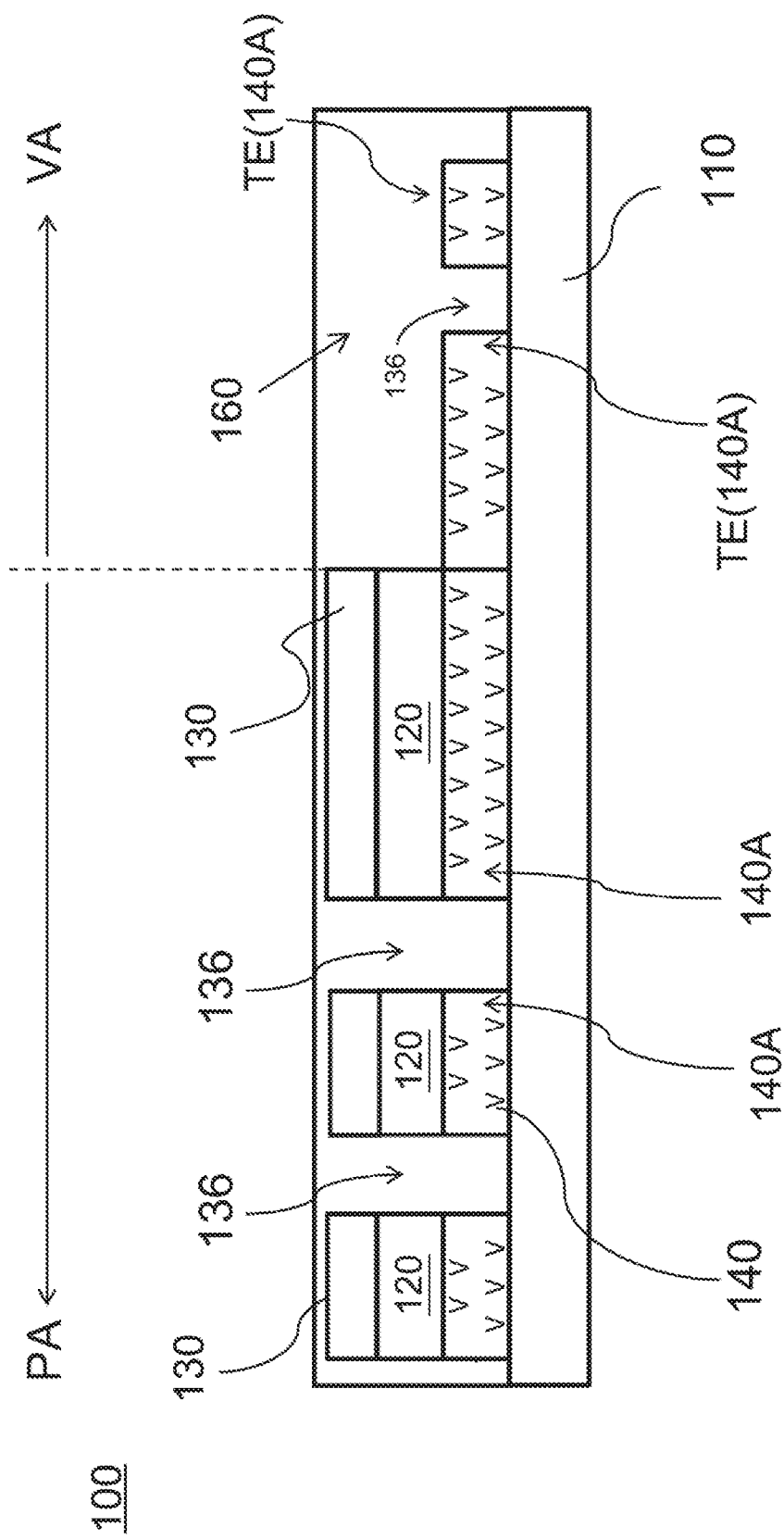
FIG. 9 is a schematic view according to another embodiment of the present disclosure.

FIG. 9 depicts a touch panel 100 according to another embodiment of the present application, and the difference between this embodiment and the embodiment shown in FIG. 8/FIG. 8A is at least that the touch panel 100 can further include a protective layer 160. The protective layer 160 covers the peripheral circuits 130, the membrane layer 120, and the metallic nanowires layer 140A in the touch sensing electrodes TE/peripheral area PA, so that the touch panel has better surface protection against scratches and abrasion. Under this circumstance, the protective layer 160 may also be referred to as a hard coat, and the structure has higher surface strength to increase scratch resistance by using such as polyacrylate, epoxy resin, polyurethane, polysilane, poly-siloxane, poly (silicon-acrylic), or the like. Furthermore, UV stabilizers may be added to the protective layer 160 to increase the UV resistance of the touch panel.

Figure 10:
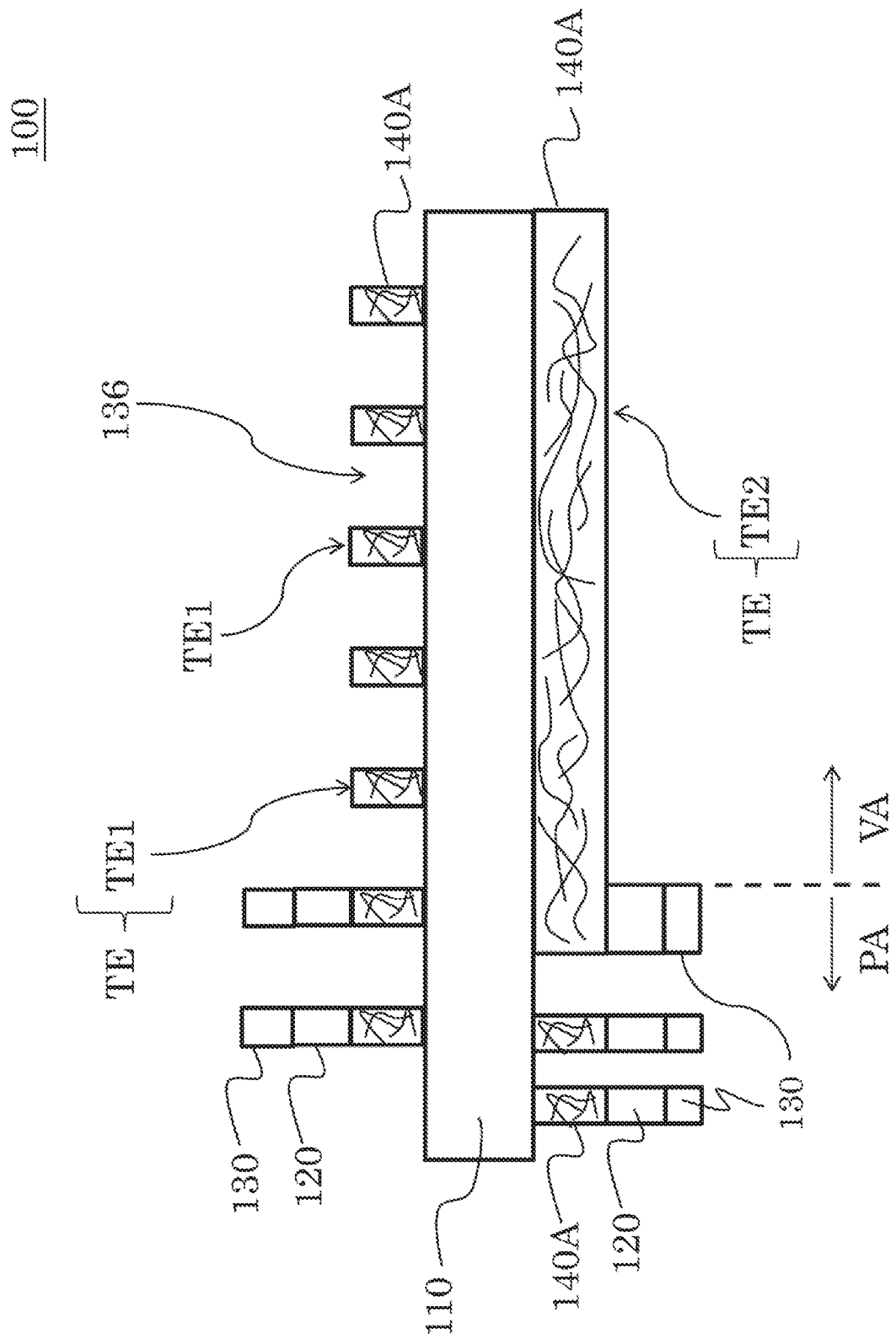
FIG. 10 is a schematic view according to another embodiment of the present disclosure.

One embodiment of the present application further provides a dual-sided/double-sided touch panel 100. As shown in FIG. 10, the metallic nanowires layer 140A, the membrane layer 120, and the conductive layer 130A are manufactured on the first surface (such as the upper surface) and the second surface (the lower surface) of the substrate 110 according to the above-mentioned processes. Please refer to the foregoing description, and it is not described again here. Specifically, in the visual area VA, the first touch sensing electrode TE1 is formed on the first surface of the substrate 110, and the second touch sensing electrode TE2 is formed on the second surface of the substrate 110. In the peripheral area PA, the peripheral routing having the peripheral circuits 130, the membrane layer 120, and the metallic nanowires layer 140A is also disposed on the first and second surface of the substrate 110, and the peripheral circuits 130 are connected to the first touch sensing electrodes TE1 and the second touch sensing electrodes TE2. In one embodiment, the first touch sensing electrode TE1 is roughly located in the visual area VA, and may include a plurality of long and stripped-shaped sensing electrodes extending along the same direction (such as the first direction D1), and the etching-removed area may be defined as a non-conductive area 136 to electrically isolate the adjacent first touch sensing electrodes TE1. Similarly, the second touch sensing electrode TE2 is roughly located in the visual area VA, and may include a plurality of long and stripped-shaped sensing electrodes extending along the same direction (such as the second direction D2), and the etching-removed area may be defined as a non-conductive area 136 to electrically isolate the adjacent second touch sensing electrodes TE2.

The first touch sensing electrode TE1 and the second touch sensing electrode TE2 are staggered with each other in structure, and the two touch sensing electrodes TE1, TE2 perform as a touch sensing electrode TE in order to sense a touch or control gestures on the device. Both of the first touch sensing electrodes TE1 and the second touch sensing electrodes TE2 are not covered by the membrane layer 120, so the visual/optical effect and the quality can be increased.

Figure 11:
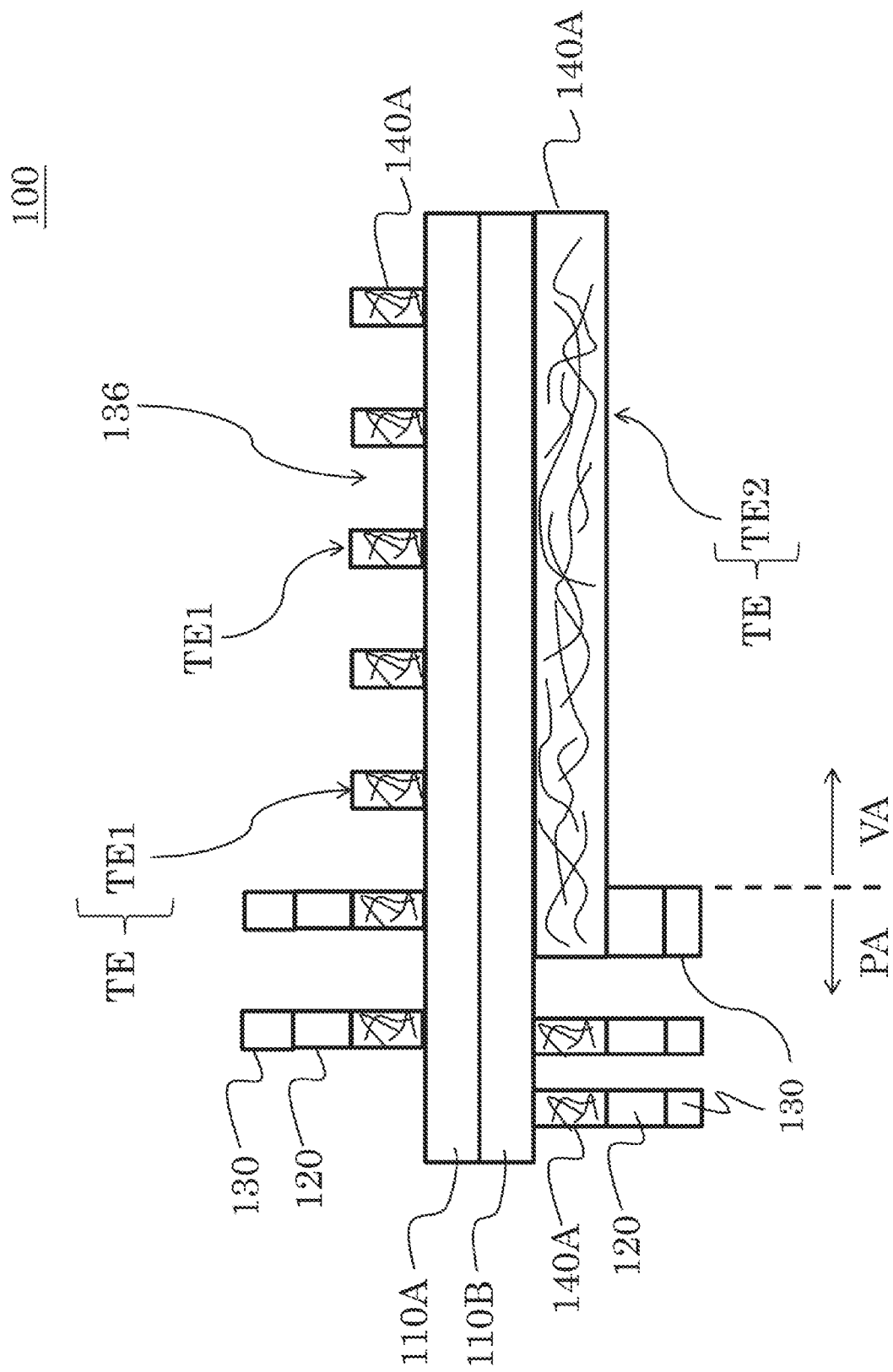
FIG. 11 is a schematic view according to another embodiment of the present disclosure.

A touch panel 100 is further provided in one embodiment of the present application. As shown in FIG. 11, the metallic nanowires layer 140A, the membrane layer 120, and the conductive layer 130A are manufactured on the first substrate 110A and the second substrate 110B, and then the steps including patterning or the like according to the above-mentioned processes are performed. Please refer to the foregoing description for the details, and it is not described again here. Specifically, in the visual area VA, the first touch sensing electrodes TE1 and the peripheral routing made of the peripheral circuits 130, the membrane layer 120, and the metallic nanowires layer 140A are formed on the first substrate 110A, and the second touch sensing electrodes TE2 and the peripheral routing having the peripheral circuits 130, the membrane layer 120, and the metallic nanowires layer 140A are formed on the second substrate 110B. In one embodiment, the first substrate 110A and the second substrate 110B can bond to each other. For example, the two substrates are bonded and fixed together using an optically clear adhesive (OCA, not shown in the figures), so that the first touch sensing electrodes TE1 and the second touch sensing electrodes TE2 are staggered with each other in structure to further constitute a touch sensing electrode TE. In addition, as shown in FIG. 11, the first substrate 110A and the second substrate 110B are bonded in opposite directions; however, the two substrates can also be assembled by bonding in the same direction.

Figure 12:
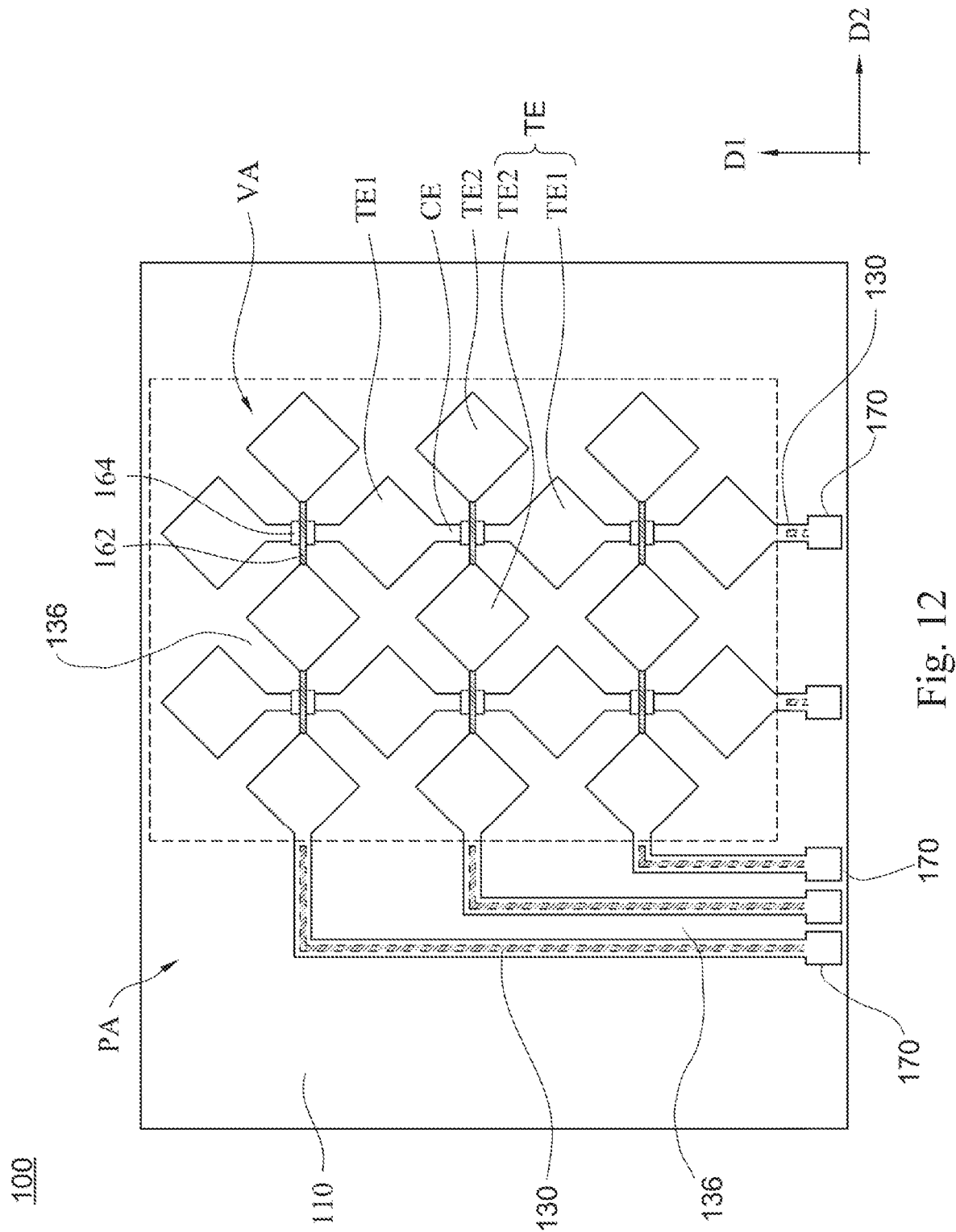
FIG. 12 is a schematic view according to another embodiment of the present disclosure.

FIG. 12 depicts another embodiment of the touch panel 100 of the present application, which is a single-sided bridge touch panel. In some embodiments of the application, the difference between this embodiment and the above-mentioned embodiment is at least that the touch sensing electrode TE formed in the substrate 110 (i.e., the metallic nanowires layer 140A) after the step of patterning described above may include a first touch sensing electrode arranged along a first direction D1, a second touch sensing electrode arranged along a second direction D2, and a connective electrode CE electrically connected to the adjacent first touch sensing electrode. Additionally, an insulating block 164 exemplarily formed of silicon dioxide may be disposed on the connective electrode CE, and a bridging conductor 162 exemplarily formed of Cu is further disposed on the insulating block 164, and the bridging conductor 162 is connected to the two adjacent second touch sensing electrodes TE2 in the second direction D2, in which the insulating block 164 is deposited between the connective electrode CE and the bridge conductor 162 in order to electrically isolate the connective electrode CE and the bridge conductor 162, so that the touch electrodes in the first direction D1 and in the second direction D2 are electrically isolated from each other.

In addition, in the embodiment shown in FIG. 12, the peripheral routing having the metallic nanowires layer 140A, the membrane layer 120, and the peripheral circuit 130 may be deposited in the peripheral area PA, and a bonding pad 170 is at the terminal of the peripheral circuit 130. Please refer to the foregoing description for the detailed process, and it is not described again here. Similar to the above-mentioned embodiment, the first touch sensing electrode TE1 and the second touch sensing electrode TE2 are not covered by the membrane layer 120, so the quality of imaging display and optical performance can be increased.

In one embodiment, the touch panel 100 of the present application (for example, the aforementioned single-sided touch panel 100, dual-sided/double-sided touch panel 100, or the like) may bond to an outer cover glass (also referred to as a protective glass, not shown in the figures) using optically clear adhesive (OCA), and it can also be assembled with other electronic devices (such as liquid crystal display elements or organic light emitting diode display elements) to form a display with touch function.

In one embodiment, the conductivity of the formed metallic nanowires 140 may be improved further by performing an after treatment. The after treatment may include processes or steps such as heating, plasma, corona discharge, UV ozone, or pressure. For example, after the step of fixing to form the metallic nanowires layer 140A, a roller may be used to provide pressure thereon. In one embodiment, 50 to 3400 psi may be applied to the metallic nanowires layer 140A provided by one or a plurality of rollers, and preferably, the pressure provided is 100 to 1000 psi, 200 to 800 psi, or 300 to 500 psi. In some embodiments, heating and pressure of the after treatment can be performed simultaneously. In detail, the pressure provided by one or a plurality of rollers as described above and heating can be simultaneously applied to the formed metallic nanowires 140. For example, the pressure provided by the roller is 10 to 500 psi, or 40 to 100 psi; meanwhile, the roller is heated to between about 70° C. and 200° C., or between about 100° C. and 175° C., which can increase the conductivity of the metallic nanowires layer 140A. In some embodiments, the metallic nanowires 140 are preferably exposed to a reducing agent for the after treatment, for example, the metallic nanowires 140 made of silver nanowires are preferably exposed to a silver reducing agent for the after treatment, and the silver reducing agent includes a borohydride such as sodium borohydride, a boron nitrogen compound such as dimethylaminoborane (DMAB), or a gas reducing agent such as hydrogen ($H_2$). The exposure time is about 10 seconds to about 30 minutes, or about 1 minute to about 10 minutes. The above-mentioned steps of pressure providing may be implemented in the appropriate steps according to the actual demand.

The structures, materials, and processes in different embodiments of the present application can be mutually referenced, and are not limited to the above-mentioned specific embodiments.

In some embodiments of the present application, the metallic nanowires layer in the visual area (also referred to as the visible area) is exposed out of the membrane layer to form a touch sensing electrode. Therefore, as a whole, it helps to reduce the loss of the optical characteristics of the membrane layer, and especially, improve the output quality of imaging applied to display elements.

In some embodiments of the present application, the composite structure layer of the peripheral circuit can form a low-impedance conductive circuit using a metal in the upper layer with good conductivity and a solder pad of an external circuit board to improve the transmission of the touch signal, thereby reducing the loss and the distortion of the transmission of touch signals.

In some embodiments of the present application, the composite structure layer of the peripheral circuit can be formed in the etching process without alignment, so errors in the alignment step can be avoided so as to improve process yield; meanwhile, it can decrease the reserved alignment error space, thereby effectively reducing the width of the peripheral area and forming narrow/ultra-narrow frames.

In some embodiments of the present application, the process may be combined with a roll-to-roll manufacture technology to form touch panels with single-sided/dual-sided electrode structures continuously and in a number of batches.

While the application has been described by way of example and in terms of the preferred embodiments, it is to be understood that the application is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrode structure, comprising:
   a metallic nanowires layer having metallic nanowires; and
   a membrane layer, wherein:
   a first portion of the metallic nanowires layer is covered by the membrane layer,
   a second portion of the metallic nanowires layer is exposed out of the membrane layer,
   the membrane layer is made of a copolymer formed by mixing two or more materials having different functional groups,
   the membrane layer comprises an ingredient A and an ingredient B,
   the ingredient A comprises a compound having a hydrocarbon group, a carboxyl group, a sulfonic acid group, an amine group, a functional group derived from at least one of the hydrocarbon group, the carboxyl group, the sulfonic acid group, or the amine group, or a derivative thereof,
   the ingredient B comprises a compound having an acrylate functional group, an aromatic functional group, an aliphatic functional group, or a derivative thereof, and
   a weight ratio of the ingredient A to the ingredient B in the copolymer is 1:1 to 1:5.

2. The electrode structure of claim 1, wherein the membrane layer is dissolved in a basic solvent.

3. The electrode structure of claim 1, wherein the metallic nanowires of the first portion of the metallic nanowires layer are embedded into the membrane layer to form a composite conductive layer.

4. A touch panel, comprising:
   a substrate;
   a metallic nanowires layer having metallic nanowires;
   a membrane layer, wherein:
   the membrane layer is made of a copolymer formed by mixing two or more materials having different functional groups, the membrane layer comprises an ingredient A and an ingredient B, the ingredient A comprises a compound having a hydrocarbon group, a carboxyl group, a sulfonic acid group, an amine group, a functional group derived from at least one of the hydrocarbon group, the carboxyl group, the sulfonic acid group, or the amine group, or a derivative thereof, the ingredient B comprises a compound having an acrylate functional group, an aromatic functional group, an aliphatic functional group, or a derivative thereof, and a weight ratio of the ingredient A to the ingredient B in the copolymer is 1:1 to 1:5; and a peripheral routing, wherein:
  a first portion of the metallic nanowires layer is covered by the membrane layer,
  a second portion of the metallic nanowires layer is exposed out of the membrane layer,
  a touch sensing electrode comprises the second portion of the metallic nanowires layer,
  the peripheral routing comprises a peripheral circuit, the membrane layer, and the first portion of the metallic nanowires layer, and
  the touch sensing electrode is electrically connected to the peripheral routing.

5. The touch panel of claim 4, wherein the membrane layer is dissolved in a basic solvent.

6. The touch panel of claim 4, wherein the metallic nanowires of the first portion of the metallic nanowires layer are embedded into the membrane layer to form a composite conductive layer.

7. The touch panel of claim 4, wherein:
the touch sensing electrode comprises a plurality of sensing electrodes, and
a non-conductive area is between two adjacent sensing electrodes of the plurality of sensing electrodes.

8. The touch panel of claim 7, wherein the non-conductive area is a gap.

9. The touch panel of claim 7, wherein the plurality of sensing electrodes are disposed on a first surface and a second surface of the substrate.

10. The touch panel of claim 4, wherein the touch sensing electrode comprises:
a plurality of first touch sensing electrodes arranged along a first direction;
a plurality of second touch sensing electrodes arranged along a second direction;
a connective electrode electrically connected to two adjacent first touch sensing electrodes of the plurality of first touch sensing electrodes;
an insulating block disposed on the connective electrode; and
a bridging conductor disposed on the insulating block, wherein the bridging conductor is connected to two adjacent second touch sensing electrodes of the plurality of second touch sensing electrodes.

11. The electrode structure of claim 1, wherein the metallic nanowires comprise at least one of silver nanowires, gold nanowires, or copper nanowires.

12. The electrode structure of claim 1, wherein an average diameter of the metallic nanowires is 20 nm to 100 nm and an average length of the metallic nanowires is 20 μm to 100 μm.

13. The electrode structure of claim 1, wherein the ingredient A is selected to be removable by an alkaline solvent having a pH of greater than 7.

14. The electrode structure of claim 1, wherein the weight ratio of the ingredient A to the ingredient B in the copolymer is 1:1 to 1:3.

15. The electrode structure of claim 1, wherein the weight ratio of the ingredient A to the ingredient B in the copolymer is 1:1.5 to 1:2.

16. The electrode structure of claim 1, wherein the membrane layer overlies the first portion of the metallic nanowires.

17. The touch panel of claim 4, wherein:
the substrate defines a visual area and a peripheral area, and
the first portion of the metallic nanowires layer is in the peripheral area.

18. The touch panel of claim 17, wherein the second portion of the metallic nanowires layer is in the visual area.

19. The touch panel of claim 4, comprising a protective layer disposed between the first portion of the metallic nanowires layer and the second portion of the metallic nanowires layer.

20. The touch panel of claim 4, comprising a protective layer, wherein a first portion of the membrane layer is separated from a second portion of the membrane layer by the protective layer.

* * * * *